June 22, 1937.  J. D. WILLIAMS  2,084,931
DEEP SEA ROD PISTOL GRIP
Filed Dec. 7, 1936
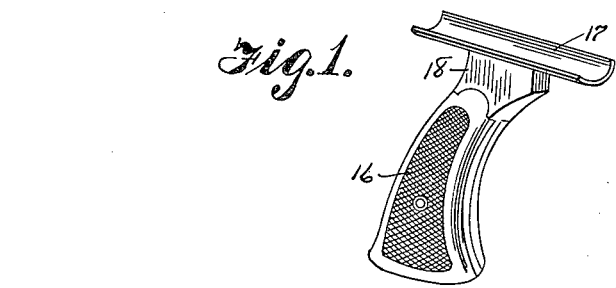
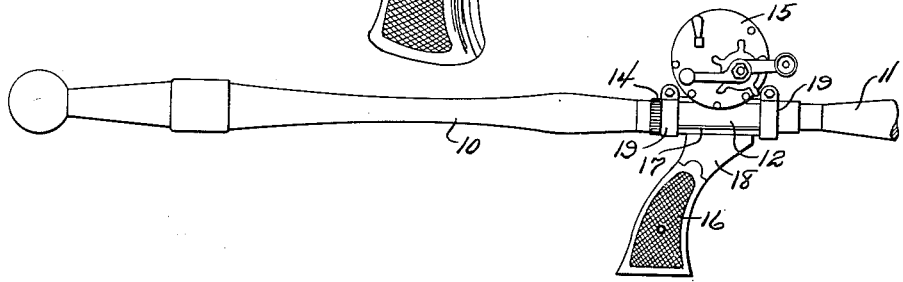
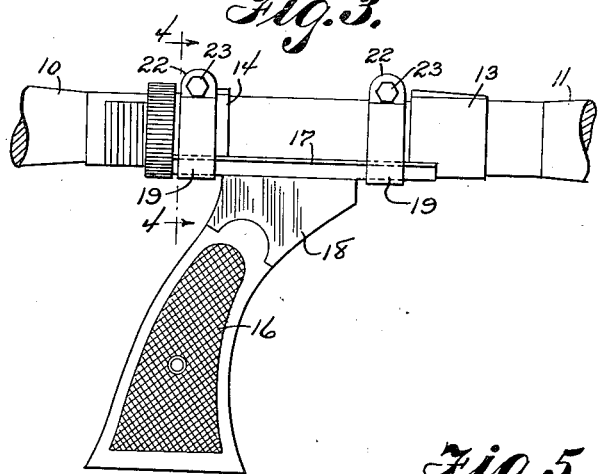 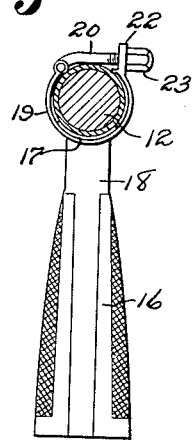
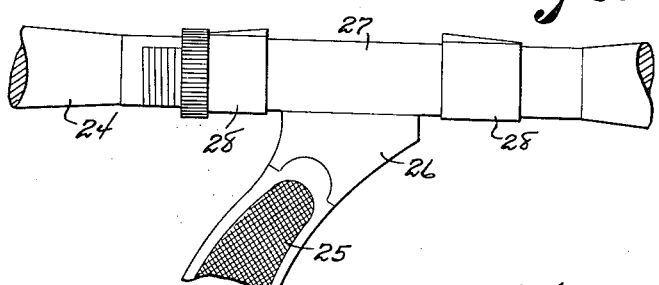
John D. Williams
INVENTOR
BY Victor J. Evans & Co.
ATTORNEYS Patented June 22, 1937

2,084,931

UNITED STATES PATENT OFFICE 2,084,931

DEEP SEA ROD PISTOL GRIP

John D. Williams, Philadelphia, Pa.

Application December 7, 1936, Serial No. 114,690

1 Claim. (Cl. 43—23)

This invention relates to deep sea rod pistol grips and has for an object to provide a pistol grip for deep sea fishing rods that will eliminate twisting of the rod in the hand and the cramping of the wrists and arms when fighting a large strong fish.

A further object is to provide a deep sea pistol grip which will balance the rod as conventional rods are more or less out of balance by reason of the weight of the reel, the pistol grip of the present invention being designed to be located on the reel seat and with its weight counterbalancing the weight of the reel.

A further object is to provide a deep sea pistol grip which may be supplied as an accessory for use on rods already in use, or may be formed integral with the rod at the time of manufacture of the rod without alterations to the present day efficient deep sea fishing rod construction.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view of a pistol grip constructed in accordance with the invention and adapted to be supplied as an accessory to fit all conventional deep sea fishing rods.

Figure 2 is a fragmentary side elevation of the butt end of a deep sea fishing rod showing the reel and the pistol grip applied to the reel seat.

Figure 3 is an enlarged side elevation similar to Figure 2.

Figure 4 is a cross sectional view taken on the line 4—4 of Figure 3 looking in the direction of the arrowheads.

Figure 5 is a side elevation of a modified form of the invention, the pistol grip in this instance being formed integral with the reel seat during manufacture of the fishing rod.

The difficulties inherent with present day deep sea rods is that the rod is round at the butt or grip and is very difficult to hold when reeling in a large fish in that the rod is prone to twist and turn in the hand and cause blisters and cause the wrist and arm to cramp badly if the fish must be fought over a considerable period of time.

The present invention eliminates these difficulties in that when a large fish strikes the fisherman places the end of the rod under the left arm pit and grasps the pistol grip firmly with the left hand which is a natural position of the arms and hands to positively prevent the rod being jerked out from the hand and at the same time positively prevent any tendency of the rod twisting so that while the rod is firmly and comfortably held with great convenience with the left hand and left shoulder pit, the right hand can be utilized to reel in the fish without undue strain and in far less time than has been hitherto accomplished.

Referring now to the drawing in which like characters of reference designate similar parts in the various views, 10 designates the butt portion of a deep sea fishing rod 11, 12 designates the cylindrical reel seat, 13 designates the front ferrule under which the front end of the base of the reel may be slipped in the customary manner and 14 designates the conventional traveling sleeve which secures the rear end of the base of the reel 15 to the reel seat 12. These parts are all conventional and well known.

In carrying out the invention I may provide a pistol grip 16 as an accessory to be applied to deep sea fishing rods of the type above described and in this embodiment of the invention the pistol grip 16 may be simply a conventional pistol grip of the type applied to revolvers with the exception that a flange 17 is formed integral with the neck 18 of the grip and is transversely curved as shown in Figure 1 to conform to the contour of the cylindrical reel seat 12 of the rod. The flange 17 and neck 18 may be molded, pressed, spot welded or assembled in any suitable manner.

A pair of conventional fishing rod clamps 19 may be used to clamp the flange 17 at its projecting front and rear ends to the reel seat 12. These clamps are conventional and comprise a split ring having a pivoted threaded lever 20 projecting from one end and adapted to be inserted in an eye 22 located at the other end, there being a nut 23 threaded on to the lever and advanced tightly against the eye 22 to tighten the clamp ring around the reel seat 12 and the flange 17 of the pistol grip and positively prevent twisting or creeping of the pistol grip when the rod is subjected to terrific strains when fighting a large fish during a long period of time.

A modified form of the invention is shown in Figure 5, in which a conventional deep sea fishing rod 24, during the course of manufacture, is provided with the pistol grip 25, in this instance the neck 26 of the pistol grip being formed integral with the cylindrical reel seat 27 by casting, spot-welding or any other method of permanently joining the grip to the reel seat on the opposite side thereof from the position at which the reel is clamped by the conventional reel clamps 28.

In operation, when a large fish strikes the fisherman places the end of the butt 10 firmly underneath the left arm pit and grasps the pistol grip 16 with the left hand. In this position the right hand is left free to manipulate the reel while at the same time the fish cannot jerk the rod from the fisherman's hand or twist the rod in his hand. The natural position assumed by the arm, hand and wrist when the pistol grip is in use as just described permits of great convenience while at the same time great power being applied to hold the rod firmly without shocks and jars being distributed to the hand, wrist and arm that might tend to cause discomfort, fatigue, and cramp even if a large fish must be fought for a long period of time. It has been found in practice that when the pistol grip has been used as just described, the right hand will be free and unobstructed to manipulate the reel with great leverage and as a result extremely large fish may be landed in far less time than has been hitherto necessary to accomplish this result.

From the above description it is thought that the construction and operation of the invention will be fully understood without further explanation.

What is claimed is:

A deep sea fishing rod having a reel seat, a pistol grip having an elongated flange shaped to conform to the contour of the reel seat, and clamps adapted to embrace the reel seat and the ends of the flange and secure the pistol grip to the reel seat.

JOHN D. WILLIAMS.